(No Model.)
W. C. REICHENEKER.
GUARD FOR BARBED WIRE FENCES.
No. 319,506. Patented June 9, 1885.
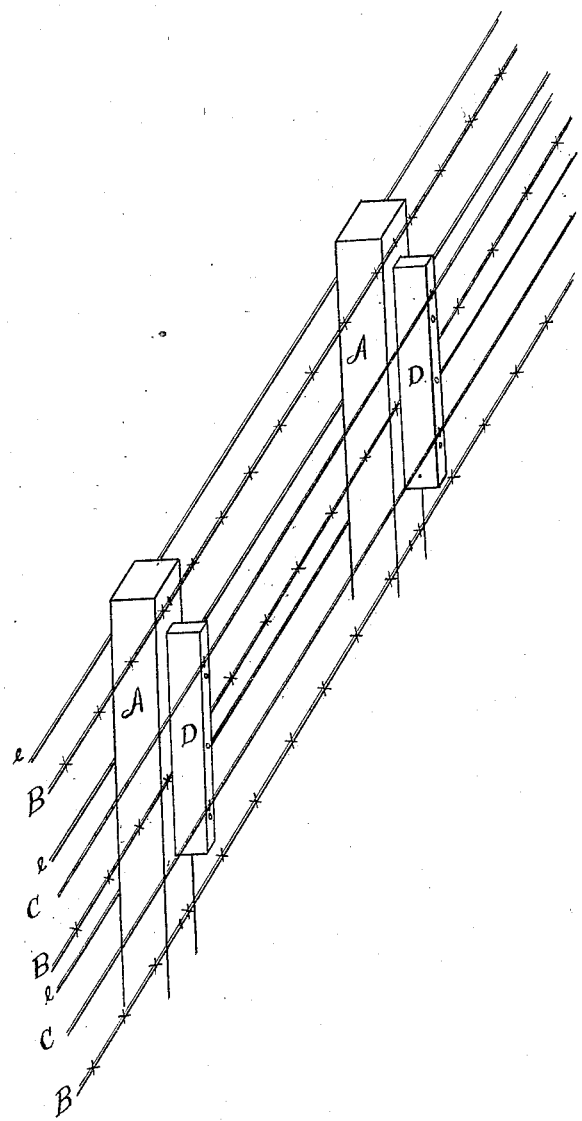
Witnesses:
D. A. McDonald
Francis Fitzsimons
Inventor:
W. C. Reicheneker

United States Patent Office.

WILLIAM C. REICHENEKER, OF DENVER, COLORADO, ASSIGNOR OF ONE-SIXTH TO JNO. A. BAKER, OF WASHINGTON, DISTRICT OF COLUMBIA.

GUARD FOR BARBED-WIRE FENCES.

SPECIFICATION forming part of Letters Patent No. 319,506, dated June 9, 1885.

Application filed May 17, 1884. (No model.)

*To all whom it may concern:*

Be it known that I, WILLIAM C. REICHENEKER, a citizen of the United States, residing at Denver, in the county of Arapahoe and State of Colorado, have invented a new and useful Guard for Barbed-Wire Fences, of which the following is a specification.

I am aware that guards of plain wire have been applied to barbed-wire fences; but in these instances of which I have knowledge the guard-wires have been supported upon metallic arms formed integral with the posts or attached thereto by bolts or other similar means.

Cattle and horses are generally injured while at play, and the injury is caused by their running upon the fence before it is seen, and in trying to avoid it they sheer off, and before losing their momentum receive a raking cut from a large number of barbs. Guard-wires or strips prevent this by springing in sufficiently to enable the barbs to give warning; but becoming taut their elasticity enables the animal to recover its balance and bear off on the plain wires without further injury from the barbs. On account of the manner in which such injuries occur it is necessary to use a sufficient number of guard-wires to thoroughly protect the stock, and this necessitates a corresponding number of metallic arms, which increases the expense and adds to the labor of construction. Such constructions are necessarily expensive, and also inconvenient in their application to fences already built; and to remedy these objections is the purpose of my invention. The manner in which the result is attained is fully set forth in the following specification, which is to be taken in connection with the accompanying drawing.

The figure shows in perspective a barbed-wire fence to which my invention is applied.

A A represent the posts, to which are fastened in the usual manner any number of barbed wires, B B B. After the barbed wires are attached a cleat or slab, D, is nailed or spiked longitudinally to each of the posts, and to this cleat are attached a series of plain guard-wires or metallic strips, C.

The cleats above mentioned may be of any desired thickness, but of length sufficient to support the desired number of guard-wires, and of the proper width to maintain them at the necessary distance from the barbed wires.

When the fence is to be used as a division-fence an additional series of guard wires or strips, e, may be fastened directly to the posts on the side opposite to that to which the barbed wires are attached, thus furnishing the fence at a slight expense with a complete series of guard-wires on both sides, a result which could only be attained in the fences before described by welding or bolting on several additional arms for the support of the guard-wires.

A fence built according to my invention will cost but little more than one of ordinary construction, as the use of the plain guard-wires will allow the use of a smaller number of the barbed wires, and the plain wires are cheaper.

My invention also presents decided advantages over the other fences in the facility with which it can be applied to existing fences, and the simple manner by which it may be adapted to use as a division-fence.

What I claim, and desire to secure by Letters Patent, is—

1. The combination of the posts A, the barbed wires B attached thereto, the cleats D, nailed longitudinally to the posts over the barb-wires, a series of plain guard wires or strips attached to and supported by said cleats, and a second series of guard wires or strips attached directly to the posts on the side opposite to the barbed wires, as and for the purpose set forth.

2. The combination of the posts A, the barbed wires B attached thereto, the cleats D, nailed longitudinally to the posts over the barbed wires, and a series of plain guard wires or strips secured to and supported by said cleats, in the manner and for the purpose set forth.

In testimony whereof I affix my signature in presence of two witnesses.

WILLIAM C. REICHENEKER.

Witnesses:
D. A. McDONALD,
DAVID M. OLIVER.